United States Patent
de Bussy

[15] 3,659,029
[45] Apr. 25, 1972

[54] ELECTRICAL HIGH-TEMPERATURE MELTING FURNACE

[72] Inventor: Jacques Marie Yves le Clerc de Bussy, Bussy par Poix, France

[73] Assignee: Societe de Participations Verrieres, Paris, France

[22] Filed: Mar. 19, 1971

[21] Appl. No.: 126,159

[30] Foreign Application Priority Data

Mar. 27, 1970  France.................................7011235

[52] U.S. Cl..................................................................13/6
[51] Int. Cl. ...........................................................C03b 5/02
[58] Field of Search..............................................13/6; 65/327

[56] References Cited

UNITED STATES PATENTS

| 3,147,328 | 9/1964 | de Bussy | 13/6 |
| 3,429,972 | 2/1969 | de Bussy | 13/6 |
| 3,580,976 | 5/1971 | de Bussy | 13/6 |

Primary Examiner—Harold Broome
Attorney—Holman & Stern

[57] ABSTRACT

High-temperature melting furnace comprising a vessel having a molten product extracting means surrounded by melting electrodes. A ceramic refractory lining covers the inner face of the vessel. Sealing means are provided for sealing off the whole of the face of the vessel from the exterior. Means are also provided for constantly blowing in a region located at the bottom of the vessel a small amount of inert gas into the lining which opposes penetration into the lining of gases liable to attack the metal of the support of the extracting means and the metal of the electrode rods in contact with the lining.

10 Claims, 2 Drawing Figures

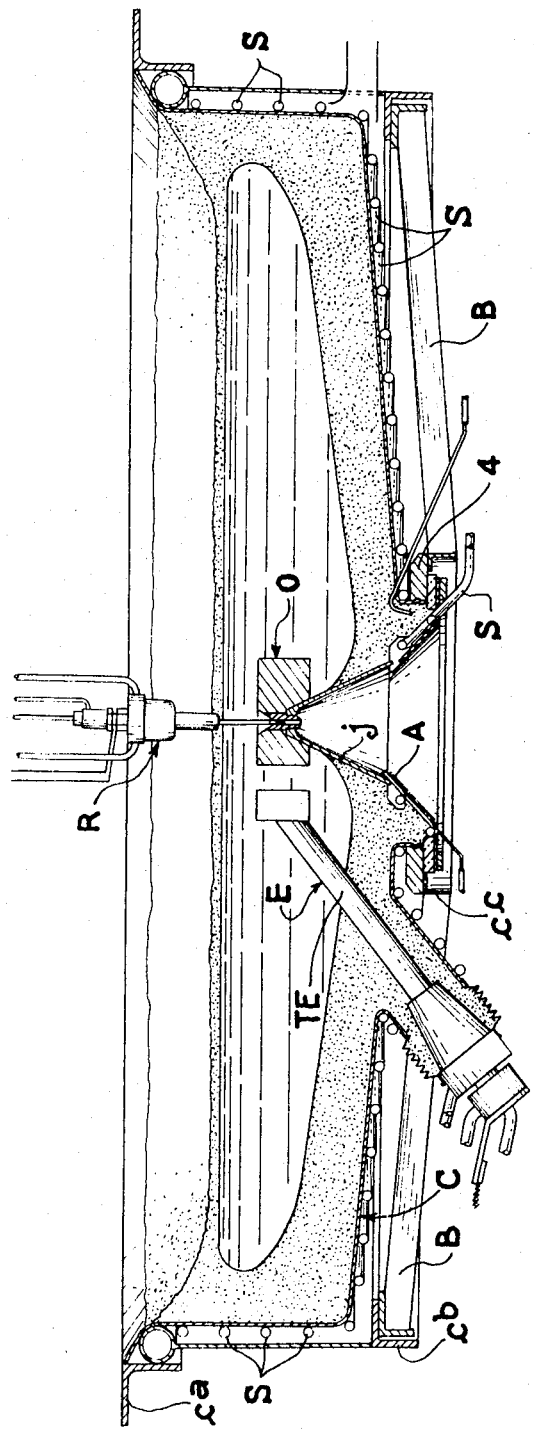

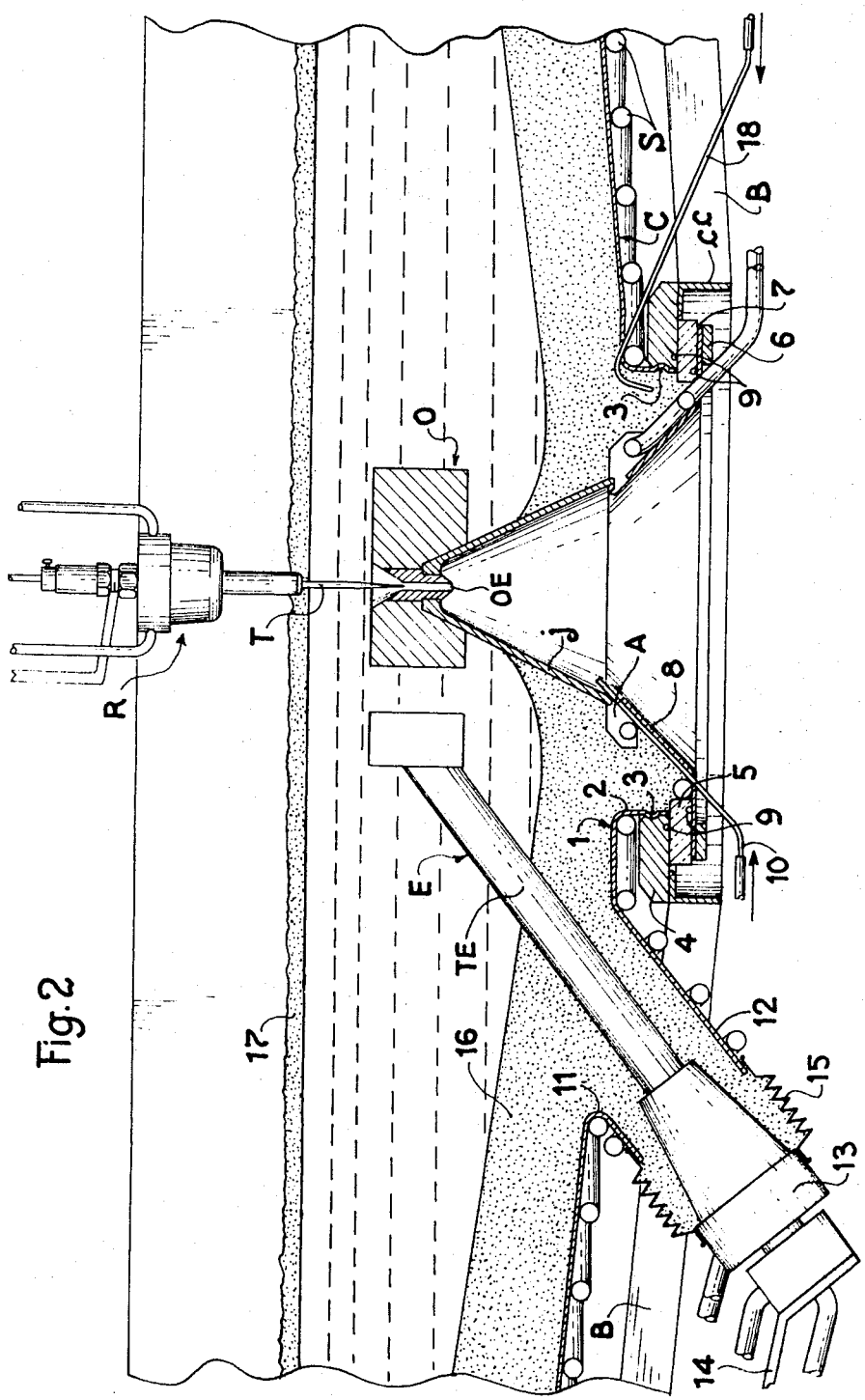

ELECTRICAL HIGH-TEMPERATURE MELTING FURNACE

The present invention relates to electrical melting at very high temperature and more particularly concerns an improved electrical furnace for melting glass and ceramic materials. Several of these furnaces have been described in U.S. Pat. Nos. 3,147,328, 3,376,373 and 3,429,972.

The furnaces disclosed in these patents comprise a vessel in which the molten material, the electrodes and an outlet passage for the molten product are arranged symmetrically around the vertical axis of the furnace along which the molten product flows. Further, the vessel, which is maintained in the cooled state, is provided over its wall with a lining of refractory ceramic which insulates the vessel proper from the molten material contained therein.

This lining can consist for example of powdered refractory materials which are assembled by tamping (the chemical bond being achieved by sodium silicate for example to which a small amount of water is added) or previously baked elements (ceramic bond) which are assembled in the vessel. Alternatively, in particular when it concerns the melting of refractory materials, it is the mixture of the very powder to be melted which constitutes the lining. In the last mentioned case, the refractory lining has no need to be assembled. However, in all the aforementioned cases the lining is porous and consequently permeable to gases.

In the furnaces disclosed in the aforementioned patents, the lining is the center of gas flows of two types namely (a) owing to the "chimney effect"; air coming from component parts of the construction of the furnace for example from unsealed assemblies of various devices is drawn in the lower regions of the furnace and flows upwardly and this air draws along oxygen; (b) owing to partial volatilization of some elements forming part of the mixtures to be melted, for example fluorides and sulphides, there are formed, in combination with ever-present water, heavy vapors of hydrofluoric acid (HF), fluosilicic acid ($SiF_6H_2$), sulphuric acid ($SO_4H_2$) etc. These heavy vapors and gases are partly arrested by the edge of the vessel which is necessarily higher than the level of the molten material, where they are produced; they then enter by way of the porosities of the lining on the periphery and thus reach the part of the lining located under the molten mass.

It should also be mentioned that the lining and the vessel carrying it are traversed by several devices, for example the three electrode rods which supply the electrical energy to the electrodes proper, the support for the outlet passage which carries the centre electrode and possibly other accessories, for example the furnace draining passage. Now, the metal of these various devices is necessarily highly refractory (melting point above 2,500° C) and must not dissolve in the products being melted. Only metals such as molybdenum, tungsten or tantalum may be used. All these metals are, in the hot state, very sensitive to oxidation and, at lower temperatures (50°–150° c), very sensitive to certain chemical attacks.

Not withstanding the fact that in the furnace the metal is protected by the molten material itself, the problem of the protection of the metal exists when the devices thereof must extend from the melting region where they are protected and pass through the lining before reaching the region where, after cooling, they bear on component parts which are composed of ordinary metal and are capable of actuating or supporting them.

As already explained, it is indeed in the lining that the metal attacking conditions are the most dangerous, since oxygen and acid vapors permanently pass through the lining, the oxygen being harmful in particular at temperatures exceeding 450° C, whereas the acid vapors are particularly so at temperatures below 200° C.

In the furnaces disclosed in the aforementioned patents, the chemical attack of the metal is precluded by forming around the vulnerable parts a protective sheath or layer of glass. In the glass-making applications of the furnace, the lining never comes in contact with the metal and the glass of the protective layer is introduced in a space purposely left free. Although this arrangement is usually satisfactory when it concerns melting glass-making products, it is not advisable to employ it when it concerns the production of refractory products since they cannot be brought to the delicate regions owing to their very high melting temperature (1,500° C) and owing to the fact that their viscosity range is very small with respect to that of glasses. To overcome this, before starting up the furnace, there may be disposed in the vicinity of the delicate regions a heavy glass in powdered form (see in particular U.S. Pat. No. 3,429,972). This glass melts in the course of the temperature rise and produces the protective layer.

However in the course of the utilization of the furnace thus arranged, it was noticed that this is still not sufficient. Indeed, within time, the glass is absorbed by capillarity in the adjacent lining. It will be clear that this glass cannot be replaced when the furnace is in use so that, after a period of operation, the glass of the layer disappears, the sealing is no longer achieved and rapid attack is liable to occur on the electrode rods and on the support of the means extracting the refractory metal. This attack may result in the severing or perforation of the corresponding device in some cases.

An object of the invention is to provide an electric melting furnace which does not have these drawbacks and in which no metal attack occurs in either glass-making or ceramic production, there being no provision of a sealing layer of glass around the vulnerable parts.

The invention provides a high-temperature melting furnace of the type comprising a vessel in which there is a very high temperature gradient between the center region and the peripheral region, means for extracting the molten product in the center of the vessel and surrounded with melting electrodes, the extracting means and the electrodes being of a highly refractory metal, a ceramic refractory lining applied against the inner face of the vessel, sealing means for sealing the whole of the face of the vessel from the exterior and means for constantly introducing in a region located at the bottom of the vessel a small amount of inert gas into the lining which opposes the penetration in the lining of gases liable to attack the metal of the support of the extracting means and the electrode rods in contact with the vessel.

A melting furnace having the foregoing features firstly eliminates, owing to the fluidtightness of the wall of the vessel, the "chimney effect," which causes air to flow upwardly in the lining, so that the flow of air, and consequently of oxygen, through the porosities of the lining is completely precluded and, secondly, results, owing to the injection of a very small supply of an inert gas, for example argon or nitrogen, in the creation in the lining of a protective atmosphere around the sensitive parts of metal, so that there can be no attack by chemical substances produced on the surface of the bath of molten material.

This inert gas, which is introduced at the base of the furnace, progressively fills all the porosities of the lining, from the bottom to the top and finally escapes at the peripheral surface of the lining, but, owing to the fact that the gas is constantly renewed, the porosities remain filled throughout the operation of the furnace.

Further features and advantages of the invention will be apparent from the ensuing description with reference to the accompanying drawings.

In the drawings:

FIG. 1 is a diagrammatic sectional view of an electric melting furnace for glass-making or ceramic products according to the invention, and FIG. 2 is a partial sectional view of the furnace on an enlarged scale.

In the embodiment shown in the drawings, the electrical melting furnace according to the invention comprises a circular vessel C, for example copper, supported by a frame comprising two outer circular ∟-section members $c^a$ and $c^b$, an inner circular ∟-section member $c^e$ and radial connecting arms B, the assembly resting on the ground through a base (not shown). The vessel C is cooled by a nest of tubes S which are brazed to its outer face and in which flows a cooling liquid, such as water.

The furnace is provided with three electrodes E, only one of which is shown, these electrodes being disposed radially 120° apart about the center of the vessel and supported by electrode rods TE. Product-extracting means O are disposed in the center of the vessel.

In the known manner, the extracting means O bear on a support formed by a frustoconical skirt pant $j$ having a lower edge bearing on a cooled ring A, for example composed of bars. The ring A is secured to the frame of the furnace in the following manner.

The extracting means O comprise an outlet orifice OE (FIG. 2) which can be opened to a varying extent by a regulating rod or needle valve T vertically movable in a flow regulating device R.

Provided in the center of the vessel is an opening 1 which is on the axis of the furnace, the edge of the opening being downwardly formed so as to afford a flange 2. The latter is deformed at 3 to engage in a recess in a metal ring 4 fixed to the $\angle$-section member $c^c$ which is part of the furnace frame. An electrically insulating collar 5 is secured to the ring 4 by nut and bolt means (not shown). A metal ring 6 is clamped against the collar 5 by separate nut and bolt means (not shown) with interposition of a flange 7 of a frustoconical member 8 whose upper edge is brazed to the cooled ring A against which bears the skirt portion $y$ of the extracting means O. This arrangement affords an electrical insulation between the ring 4 and the member 8. As is clear from the drawing, this part of the furnace is fluidtight owing to the engagement of the deformed portion 3 of the flange 2 on the ring 4 and owing to the fact that two sealing rings 9 are interposed between the collar 5 and the ring 4 and between the flange 7 and the collar 5, respectively.

The space defined below the extracting means O by the skirt $j$ and the member 8 so filled with a gas lighter than air, such as hydrogen, so as to preclude any penetration of the surrounding air in this space whereby the elements of refractory metal, for example molybdenum, constituting the skirt $j$ and the edge of orifice OE are entirely protected from the oxygen of the air. The hydrogen is supplied by way of a pipe 10 which communicates with the space of the extracting means, through an orifice formed in the ring A.

The bottom of the vessel has three openings 11 for the passage of the electrodes, only one of which is seen in the drawings. Each opening has a water-cooled flange 12. The electrodes are mounted in suitably cooled supports 13 which need not be described in detail here. Current is supplied through a terminal 14 secured to the end of the electrode. The fluidtight and electrically insulated connection between the support 13 of the electrode E and the vessel C is achieved by a bellows 15 of relatively flexible material such as thick silicone rubber. This bellows allows the longitudinal adjustment of the electrode and also the radial adjustment thereof if necessary to compensate wear of the electrode. The bellows 15 seals the vessel in this region.

Note that the illustrated embodiment more particularly concerns a furnace for melting refractory products. In such a furnace, there is provided against the inner wall or face of the vessel a refractory lining or layer 16 which is constituted by the elements which are constituents of the material melted in the furnace. Further, the surface layer 17 of the molten material is continuously supplied in the course of the operation of the furnace by a rotary distributor (not shown). The bulb of molten material surrounding the electrode is defined on the surface by the continuously supplied layer to be melted and by the amount of material adjoining the inner face of the vessel in a region in which the temperature is lower than the melting point of the material.

The cavities defined by the faces of the openings 1 and 11 are completely filled with the powdered constituents of the molten material in the furnace. It will be understood that the refractory lining thus arranged defines a volume which extends from the center to the peripheral edge of the vessel, this volume being constituted by multiple porosities formed by the powdery constituents. In order to ensure that this volume does not become filled with harmful gases produced on the surface of the bulb of molten material, there is provided a pipe 18 supplying an inert gas preferably heavier than these harmful gases, for example argon or nitrogen, this pipe communicating with the annular cavity formed between the flange 2 and the member 8 by way of a brazed fluidtight connection. Owing to the porosity of the lining, this inert gas is introduced therein up to the upper peripheral edge of the vessel where it escapes. Thus the harmful gases produced during the melting in the bath cannot penetrate the lining and are made to escape directly upwardly.

When the furnace is specifically a glass melting furnace, the bottom of the vessel 1 and the cavities defined therein can be filled with a heavy refractory powder, such as alumina or zircon sand. Note that the presence of the refractory material in the cavities formed in the bottom of the vessel and around the electrode rods permits a reduction in the heat losses radiated from the center of the furnace and results in an increased efficiency.

Having now described my invention what I claim and desire to secure by Letters Patent is:

1. A high-temperature melting furnace comprising a vessel in which there is a very large temperature gradient between a center region and a peripheral region of the vessel, means for extracting the molten product produced in the center of the vessel, a support for said extracting means, product melting electrodes surrounding said extracting means, electrode rods supporting said electrodes and extending through said vessel, said extracting means and said electrodes being of a highly refractory metal, a ceramic refractory lining applied against an inner face of said vessel, sealing means for sealing the whole of a face of said vessel from the exterior and means for constantly blowing in a region located at the bottom of said vessel a small amount of inert gas into said lining which opposes the penetration into said lining of gases liable to attack the metal of said support of said extracting means and said electrode rods in contact with said vessel.

2. A furnace as claimed in claim 1, comprising means defining an opening located at the center of said vessel, a support ring which is integral with a frame supporting the furnace to which ring is secured in a fluidtight manner said support of said extracting means, said opening having a depending flange portion engaged in a fixed manner with said support ring.

3. A furnace as claimed in claim 2, wherein said support comprises a frustoconical skirt member, on which said skirt member bears, a cooled ring, a tapered member which is integral with said cooled ring and extends said skirt member and has a horizontal edge portion, an electrically insulating collar and a metal ring clamping said edge portion to said collar in a fluidtight manner, said support being rigidly fixed to said support ring.

4. A furnace as claimed in claim 3, comprising a sealing ring interposed between said insulating collar and said edge portion and a sealing ring interposed between said edge portion and said metal ring.

5. A furnace as claimed in claim 1, comprising means defining openings in a bottom portion of said vessel through each of which openings an electrode rod supporting an electrode extends, each opening having a flange including an edge portion integral with an elastically yieldable bellows which is fixed to the corresponding electrode support in a fluidtight manner.

6. A furnace as claimed in claim 5, wherein said bellows is composed of elastomer.

7. A furnace as claimed in claim 5, wherein said bottom portion of said vessel and a cavity defined by said edge portion of the flange of each opening and by the corresponding bellows, is filled with a powdered refractory material.

8. A furnace as claimed in claim 7, wherein said powdered material is alumina.

9. A furnace as claimed in claim 7, wherein said powdered material is zircon sand.

10. A furnace as claimed in claim 1, comprising a pipe supplying an inert gas which communicates with the bottom of said vessel near the periphery of said support for said extracting means.

* * * * *